March 12, 1940.  G. M. KRIEGBAUM  2,192,977
PLANTER
Filed Dec. 2, 1937

Inventor
George M. Kriegbaum
By V. F. Lassagne
Atty.

Patented Mar. 12, 1940

2,192,977

UNITED STATES PATENT OFFICE 2,192,977

PLANTER

George M. Kriegbaum, Richmond, Ind., assignor to International Harvester Company, a corporation of New Jersey Application December 2, 1937, Serial No. 177,677

1 Claim. (Cl. 111—14)

This invention relates to a planter. More specifically it relates to a device for planting cotton at varying depths.

In the planting of cotton, it has been discovered that a satisfactory yield of plant seedlings is best obtained under certain weather conditions by shallow planting, and under other weather conditions, by deeper planting. By spreading the seed in furrows of varying depths the weather factor as affecting the yield of plant seedlings is largely eliminated.

The principal object of the invention is to provide in connection with a cotton planter a furrow opener which is effective to make furrows in the ground of varying depths.

A further object of the invention is the provision of a furrow opener on a cotton planter frame which will continuously move up and down with respect to the frame.

Another object is to provide a furrow opener on a cotton planter frame which moves up and down with respect to the frame in response to movement of the frame over the ground.

A further object of the invention is the provision of the furrow opener on a wheel supported cotton planter frame which moves up and down with respect to the frame in response to rotation of one of the wheels supporting the frame.

According to the present invention, a hoe element is loosely attached to the seed boot of a wheel-supported cotton planter. A lever is pivoted to the planter and has one end connected to the seed boot and its other end arranged to follow a cam mounted to rotate with the front wheels. The cam is so shaped that, as the planter moves over the ground and the front wheels and the cam rotate, an up and down movement is given to the hoe element. Thus, as the planter is moved over the ground, the hoe element produces furrows of varying depths, and cotton seed is planted at varying depths.

It is to be understood that this invention is not limited to furrow openers on cotton planters but may be applied wherever it is desirable to have a ground-working tool mounted on a planter move up and down with respect to the planter.

In the drawing, the invention is illustrated, for example, in connection with a cotton planter, and:

Figure 1:
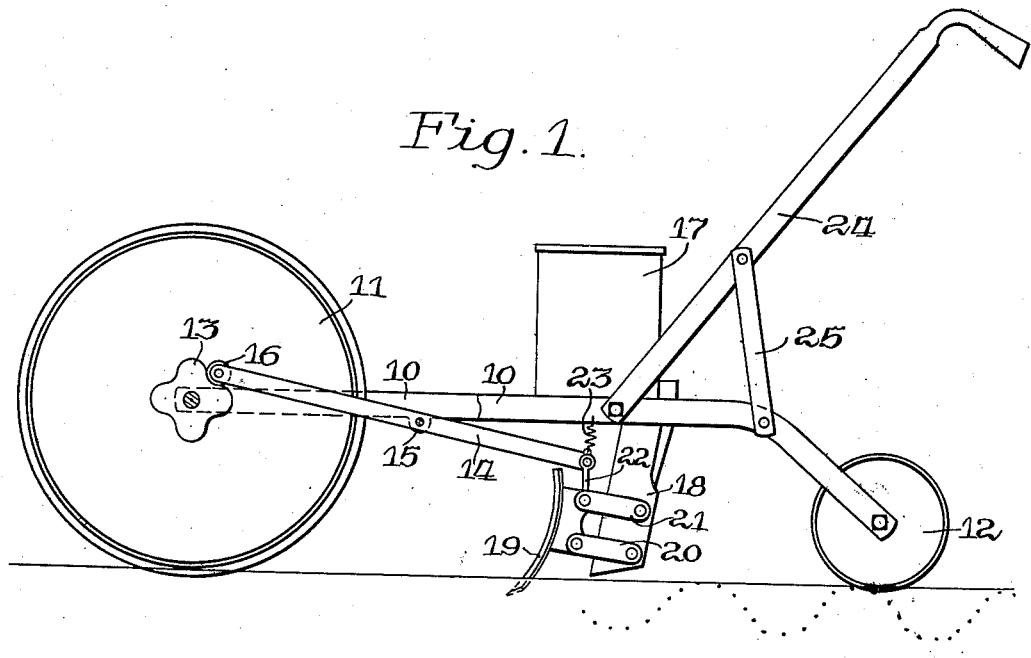
Figure 1 shows a side elevation of the cotton planter, partly in section.

The planter consists essentially of a frame formed of two longitudinally extending members 10 supported on a front planter wheel 11 and a rear wheel 12. The members 10 are fastened on either side of the wheels. A cam member 13 is mounted coaxially with the planter wheel between the frame members 10. A lever 14 is pivotally mounted between its ends on the frame members on a dependent projection 15. The forward end of this lever is arranged to follow the cam 13 through a follower 16. Rearwardly of the frame members, a seed container 17 is positioned and, extending downwardly therefrom between the frame members, is a seed boot 18. A soil working element in the form of a hoe element 19 is loosely connected to the seed boot by means of links 20 and 21. Extending upwardly from the hoe element 19 at the point of attachment of the link 21 is a member 22 which connects the hoe element with the rear end of the lever 14. A coil spring 23 extends between this end of the lever and the frame members. A handle member 24 extends upwardly from the frame members adjacent the seed boot. A brace 25 keeps the handle member 24 in fixed position with respect to the frame members.

The operation of the planter is as follows: As the planter is moved along the ground, the cam 13 rotates with the planter wheel 11. The follower 16 is held in contact with the cam through the action of the spring 23, and, as the cam rotates, the lever moves up and down, with the follower riding over the lobes of the cam. Thus, an up and down movement is given to the hoe element 19 and the ground is worked to a varying depth, as shown in the figures. Seed is dropped from the seed boot 18 continuously along the ground and, as previously explained, a better yield is obtained by this method of planting.

The attachment of the hoe element 19 to the seed boot by means of the links 20 and 21 is quite flexible and allows the furrow opener a very satisfactory freedom of movement.

Figure 2:
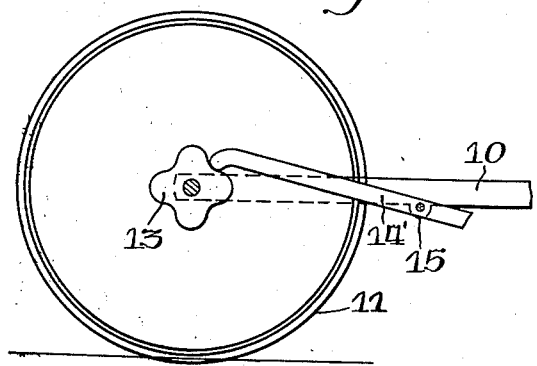
Figure 2 shows a detail of a modified form of planter.

Figure 2 shows a modified form in which a lever 14' follows the cam member 13 directly instead of by means of a follower. Otherwise, this modification is identical with that shown in Figure 1.

It will be understood that the invention is not limited to cotton planters, but may be applied wherever it is desirable to have a ground-working tool move up and down in the soil as the tool is moved across the soil.

The invention is to be considered limited only in the terms of the appended claim.

What is claimed is:

A planter comprising a frame, wheels supporting the frame, a cam member mounted on the frame to rotate with one of the wheels, a seed boot carried by the frame, a pair of links of substantially equal length pivotally attached at one end at spaced points to the seed boot, a hoe element pivotally attached to the opposite end of each link at points spaced an amount approximately equal to the spacing of the points of attachment of the links to the seed boot, a spring connecting the hoe element and the frame, and a lever pivotally attached between its ends to the frame and having one end in engagement with the cam as a follower and the other end attached to the hoe element.

GEORGE M. KRIEGBAUM.